United States Patent
Contolini et al.

(10) Patent No.: US 6,233,553 B1
(45) Date of Patent: *May 15, 2001

(54) METHOD AND SYSTEM FOR AUTOMATICALLY DETERMINING PHONETIC TRANSCRIPTIONS ASSOCIATED WITH SPELLED WORDS

(75) Inventors: Matteo Contolini; Jean-Claude Junqua; Roland Kuhn, all of Santa Barbara, CA (US)

(73) Assignee: Matsushita Electric Industrial Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/148,912

(22) Filed: Sep. 4, 1998

(51) Int. Cl.$^7$ .................................................. G10L 19/04
(52) U.S. Cl. .......................... 704/220; 704/243; 704/257; 704/251; 704/231
(58) Field of Search .................................. 704/245, 243, 704/256, 255, 235, 257, 240, 242, 231, 251, 220

(56) References Cited

U.S. PATENT DOCUMENTS

| | | | |
|---|---|---|---|
| 5,268,990 | * 12/1993 | Cohen et al. | 704/200 |
| 5,329,608 | * 7/1994 | Bocchieri et al. | 704/243 |
| 5,581,655 | * 12/1996 | Cohen et al. | 704/245 |
| 5,606,644 | * 2/1997 | Chou et al. | 704/243 |
| 5,799,276 | * 8/1998 | Komissarchik et al. | 704/251 |
| 5,832,430 | * 12/1998 | Lleida et al. | 704/256 |
| 5,855,000 | * 12/1998 | Walbel et al. | 704/235 |
| 6,009,392 | * 12/1999 | Kanevsky et al. | 704/245 |

OTHER PUBLICATIONS

Nakamura et al., ("A high–Speed Morpheme–Extraction System using Dictionary Database", Proceedings Fourth International Conference on Data Engineering Feb. 1–5, 1988, pp. 488–495).*

Rigazio et al., ("Multilevel discriminative training for spelled word recognition", Proceedings of the 1998 IEEE International Conference on Acoustics, speech and Signal Processing, May 12–15, 1998, vol. 1, pp. 489–492, 1998).*

Soong et al., (A tree–trellis based fast search for finding the N–best sentence hypotheses in continuous speech recognition, ICASSP–91, vol. 1, pp. 705–708, Apr. 1991).*

Andersen et al., ("Comparison of two tree–structured approaches for grapheme–to–phoneme conversion", ICSLP 96, vol. 3, pp. 1700–1703, Oct. 3–6, 1996).*

Lazarides et al., ("Improving decision trees for acoustic modeling", ICSLP 96, vol. 2, pp. 1053–1056, Oct. 3–6, 1996).*

* cited by examiner

*Primary Examiner*—William R. Korzuch
*Assistant Examiner*—Vijay Chawan
(74) *Attorney, Agent, or Firm*—Harness, Dickey & Pierce, P.L.C.

(57) ABSTRACT

New entries are added to the lexicon by entering them as spelled words. A transcription generator, such as a decision-tree-based phoneme or morpheme transcription generator, converts each spelled word into a set of n-best transcriptions or sequences. Meanwhile, user input or automatically generated speech corresponding to the spelled word is processed by an automatic speech recognizer and the recognizer rescores the transcriptions or sequences produced by the transcription generator. One or more of the highest scored (highest confidence) transcriptions may be added to the lexicon to update it. If desired, the spelled word-pronunciation pairs generated by the system can be used to retrain the transcription generator, making the system adaptive or self-learning.

15 Claims, 4 Drawing Sheets

METHOD AND SYSTEM FOR AUTOMATICALLY DETERMINING PHONETIC TRANSCRIPTIONS ASSOCIATED WITH SPELLED WORDS

BACKGROUND AND SUMMARY OF THE INVENTION

The present invention relates generally to speech recognition and speech synthesis systems. More particularly, the invention relates to pronunciation generation.

Computer-implemented and automated speech technology today involves a confluence of many areas of expertise, ranging from linguistics and psycho-acoustics, to digital signal processing and computer science. The traditionally separate problems of text-to-speech (TTS) synthesis and automatic speech recognition (ASR) actually present many opportunities to share technology. Traditionally, however, speech recognition and speech synthesis have been addressed as entirely separate disciplines, relying very little on the benefits that cross-pollination could have on both disciplines.

We have discovered techniques, described in this document, for combining speech recognition and speech synthesis technologies to the mutual advantage of both disciplines in generating pronunciation dictionaries. Having a good pronunciation dictionary is key to both text-to-speech and automatic speech recognition applications. In the case of text-to-speech, the dictionary serves as the source of pronunciation for words entered by graphemic or spelled input. In automatic speech recognition applications the dictionary serves as the lexicon of words that are known by the system. When training the speech recognition system, this lexicon identifies how each word is phonetically spelled, so that the speech models may be properly trained for each of the words.

In both speech synthesis and speech recognition applications, the quality and performance of the application may be highly dependent on the accuracy of the pronunciation dictionary. Typically it is expensive and time consuming to develop a good pronunciation dictionary, because the only way to obtain accurate data has heretofore been through use of professional linguists, preferably a single one to guarantee consistency. The linguist painstakingly steps through each word and provides its phonetic transcription.

Phonetic pronunciation dictionaries are available for most of the major languages, although these dictionaries typically have a limited word coverage and do not adequately handle proper names, unusual and compound nouns, or foreign words. Publicly available dictionaries likewise fall short when used to obtain pronunciations for a dialect different than the one for which the system was trained or intended.

Currently available dictionaries also rarely match all of the requirements of a given system. Some systems (such as text-to-speech systems) need high accuracy; whereas other systems (such as some automatic speech recognition systems) can tolerate lower accuracy, but may require multiple valid pronunciations for each word. In general, the diversity in system requirements compounds the problem. Because there is no "one size fits all" pronunciation dictionary, the construction of good, application-specific dictionaries remains expensive.

The present invention provides a system and method for automatically generating phonetic transcriptions, with little or no human involvement, depending on the desired accuracy of the dictionary. The invention provides a tool by which the user can specify a confidence level and the system automatically stores in the dictionary all generated pronunciations that fulfill the desired confidence level. Unlike other phonetic transcription tools, the invention requires no specific linguistic or phonetic knowledge to produce a pronunciation dictionary. The system can generate multiple pronunciations at different confidence levels, as needed, based on the requirements of the speech system being developed.

One powerful advantage of the system and method of the invention is that it uses multiple sources of information to synergistically achieve superior results. Integrating information from various dimensions gives a result that is greater than the sum of its parts. Moreover, different words may be handled by different methods, resulting in a superior final product. A non-exhaustive list of information sources applicable to the present invention includes: expert systems based on letter-to-sound rules, on-line dictionaries, morph dictionaries with morph combining rules, trainable learning subsystems, dialect transformation rules, and output from automatic speech recognition, from an operator's voice or from other audio sources.

In accordance with one aspect of the invention, a trainable learning sub-system is included that can adapt or improve as new pronunciation information is available. The trainable learning sub-system will adapt to a speaker, for example, making it easy to adapt a lexicon to a new dialect.

For a more complete understanding of the invention, its objects and advantages, refer to the following specification and to the accompanying drawings.

DETAILED DESCRIPTION OF THE PREFERRED EMBODIMENTS

Figure 1:
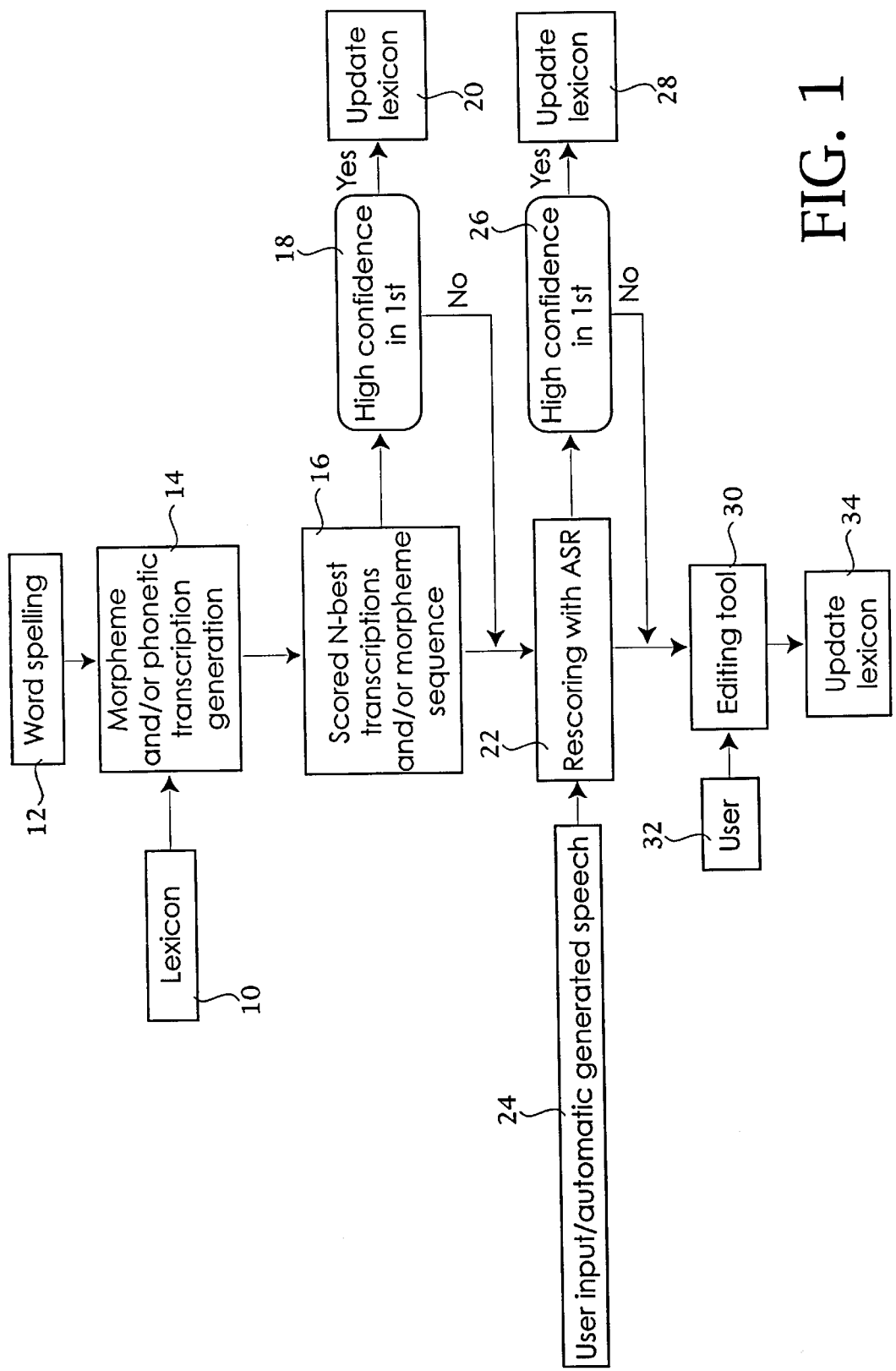
FIG. 1 is a block diagram illustrating the system and method of the invention.

FIG. 1 illustrates the principles of the invention as applied to the task of generating and/or updating a word pronunciation dictionary or lexicon. FIG. 1 illustrates the lexicon at 10. Lexicon 10 may be a previously created word pronunciation dictionary comprising ordered pairs of words (represented graphemically or as text) and one or more associated phonetic or morphemic transcriptions. As will be more fully explained, the existing lexicon 10 can be updated by adding new words to the lexicon or by adding or revising pronunciations of existing words in the lexicon.

For illustration purposes it will be assumed that the user of the system enters new words, as at 12, by spelling them. The spelled words may be input through any convenient means including keyboard entry and voice.

A transcription generator 14 receives as input (a) words from lexicon 10 and (b) spelled words entered as at 12. The transcription generator can be configured in a variety of different ways, depending on the requirements of the system. In the description presented here, a distinction is made between phonetic transcriptions and morpheme transcriptions. The former represent words in terms of the phonemes found in human speech when the word is spoken. The latter represent words as atomic units, called morphs, from which larger words are made. A compound word such as "catwalk" may be treated morphemically as comprising the atomic units "cat" and "walk."

The transcription generator may include a phonetic component, a morphemic component, or both. A presently preferred phonetic transcription component uses a phoneticizer that generates phonetic transcriptions based on spelled letter input, using a set of decision trees. Details of a suitable phoneticizer are provided below. The morpheme transcription component may be a concatenative rule-based system that includes a morph dictionary. Details of a suitable morpheme transcription system are also provided below.

The output of transcription generator 14 may be a phonetic transcription, a morpheme sequence, or both, depending on the configuration of generator 14. These output are scored in scoring module 16 so that each transcription or sequence can have a numeric value by which it can be compared with the other output transcriptions or sequences. Typically, these numeric scores are the byproduct of the transcription generation mechanism applied at 14. For example, when the decision tree-based phoneticizer is used, each phonetic transcription has associated with it a confidence level score. This confidence level score represents the cumulative score of the individual probabilities associated with each phoneme. As the reader will see from the description below, the leaf nodes of each decision tree are populated with phonemes and their associated probabilities. These probabilities are numerically represented and can be used to generate a confidence level score. Similar techniques can be employed in generating morpheme sequences.

Scoring module 16 scores the output of transcription generator 14 so that the n-best transcriptions and/or sequences are identified. If desired, the scoring module can sort the transcriptions and/or sequences in an ordered list such that the highest confidence transcription or sequence appears at one end of the list and the lowest confidence transcription or sequence appears at the other end of the list. In some instances, depending on the requirements of the system, the transcription or sequence having the highest confidence level may be adequate for use in updating the lexicon directly. The system tests for this condition at 18, such as by treating the scored transcriptions or sequences as hypotheses with associated likelihood scores. If the likelihood ratio between the top hypothesis and the second hypothesis is above a predetermined threshold, then the system automatically updates the lexicon with the top hypothesis as indicated at 20. The lexicon may be updated by adding the top hypothesis transcription or sequence to the lexicon as a new entry, or by revising an existing entry in the lexicon to incorporate the top hypothesis transcription or sequence.

If the likelihood ratio between the top and second hypotheses is not above a predetermined threshold, then a re-scoring process is applied at 22. In an alternate embodiment, the confidence checking mechanism 18 may be dispensed with; in which case the output of scoring module 16 is directly supplied to the re-scoring module 22, as illustrated.

The re-scoring module 22 incorporates a second source of knowledge about the word pronunciation. Specifically, the re-scoring module employs an automatic speech recognition technology (ASR) in which a speech signal is used to re-score the transcriptions and/or sequences resulting from module 16. The speech signal can be provided from a human speaker or from automatically generated speech. These are illustrated at 24. Suitable sources of speech include: live human speech, audio recordings, speech databases, and speech synthesizers. With regard to speech synthesizers, an interesting variation of the current system is to use a different speech synthesizer than the synthesizer being used for text-to-speech synthesis in the final system. In this way, some of the desired nuances of a first synthesizer can be incorporated into a second synthesizer.

The re-scoring module 22 extracts phonetic information from the supplied speech input at 24 and this information may be used to reorder the list of n-best transcriptions or sequences. Thereafter, another confidence test may be applied at 26, similar to that described at 18, whereupon the lexicon may be updated at 28. If the top score (after re-scoring) is high enough, the system automatically chooses it and inserts it into the lexicon at 28. Otherwise, the system enters an edit mode in which an editing tool 30 is provided for user 32 interaction. The editing tool of the preferred embodiment allows the user to select one of the selected pronunciations which most closely matches the correct one. The system presents the user with the word displayed on the screen so that individual syllables can be highlighted or selected. The user then simply selects the syllable that was pronounced incorrectly (one syllable at a time) and the system then gives the user a number of options for modifying that syllable.

Figure 2:
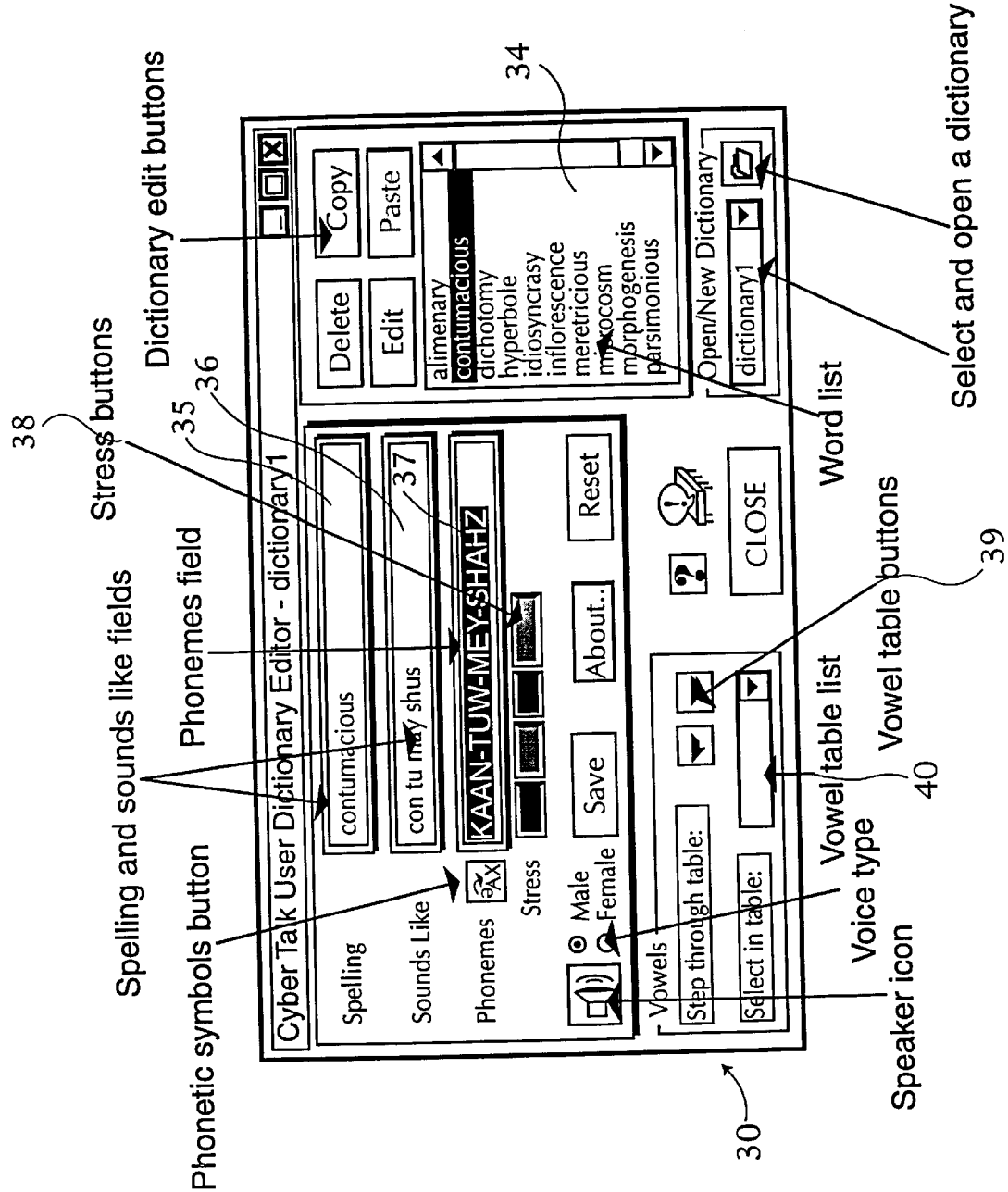
FIG. 2 illustrates an editing tool useful in implementing a system in accordance with the invention.

Referring to FIG. 2, words in the dictionary are displayed in word list 34. Highlighting any word in the word list—contumacious, for example—places that word in the spelling and sounds-like fields 35 and 36, respectively. The phonetic representation of the selected word appears in the phonemes field 37; the phonemic representation is hyphenated to demark the syllables which make up the selected word. Stress buttons 38 line up with the syllables in field 37 and the user can select these buttons to alter the stress applied to the syllable. If desired, the user can use the vowel step through buttons 39 and/or the vowel table list 40 to select different vowel sounds to substitute for those appearing in the phoneme field 37.

In one embodiment the user speaks the syllable by pronouncing it into a microphone and the system then deduces the original text spelling that corresponds to this pronunciation. Alternatively, the user can select the desired pronunciation from a menu of words that have a vowel that sounds similar to that of the highlighted syllable. The editing tool automatically presents the user with a menu of words, based on the syllable which the user selected. The tool also includes a stress level selector in the form of computer graphically generated push buttons that the user can select to increase or decrease the level of stress given to a particular syllable.

Another embodiment of the editing tool employs an automated algorithm that generates a new pronunciation sequentially, by combining parts from two pronunciation hypotheses. The user is able to hear these generated pronunciations and can pick the best one when it is heard.

Once the user is finished editing the pronunciation of one or more syllables, the system automatically produces the corrected spelling-pronunciation pair and this information is then used to update the lexicon as at 34.

In one embodiment of the invention, the system is adaptive or self-learning. One or more high confidence transcriptions may be extracted and used to retrain the transcription generator 14. Spelled word-pronunciation pairs used to update the lexicon 10 are used to supply new retraining data 34 upon which the transcription generator 14 may be retrained or updated. This can be accomplished by using the retraining data 34 as new training data for generating revised decision trees used by the transcription generator. The self-learning embodiment thus improves its transcription generator over time, resulting in even higher quality transcriptions.

The Decision Tree Phoneticizer

The presently preferred phoneticizer is a pronunciation generator employing two stages, the first stage employing a set of letter-only decision trees 110 and the second stage employing a set of mixed-decision trees 112. An input sequence 114, such as the sequence of letters B-I-B-L-E, is fed to a dynamic programming phoneme sequence generator 116. The sequence generator uses the letter-only trees 110 to generate a list of pronunciations 118, representing possible pronunciation candidates of the spelled word input sequence.

The sequence generator sequentially examines each letter in the sequence, applying the decision tree associated with that letter to select a phoneme pronunciation for that letter based on probability data contained in the letter-only tree.

Figure 3:
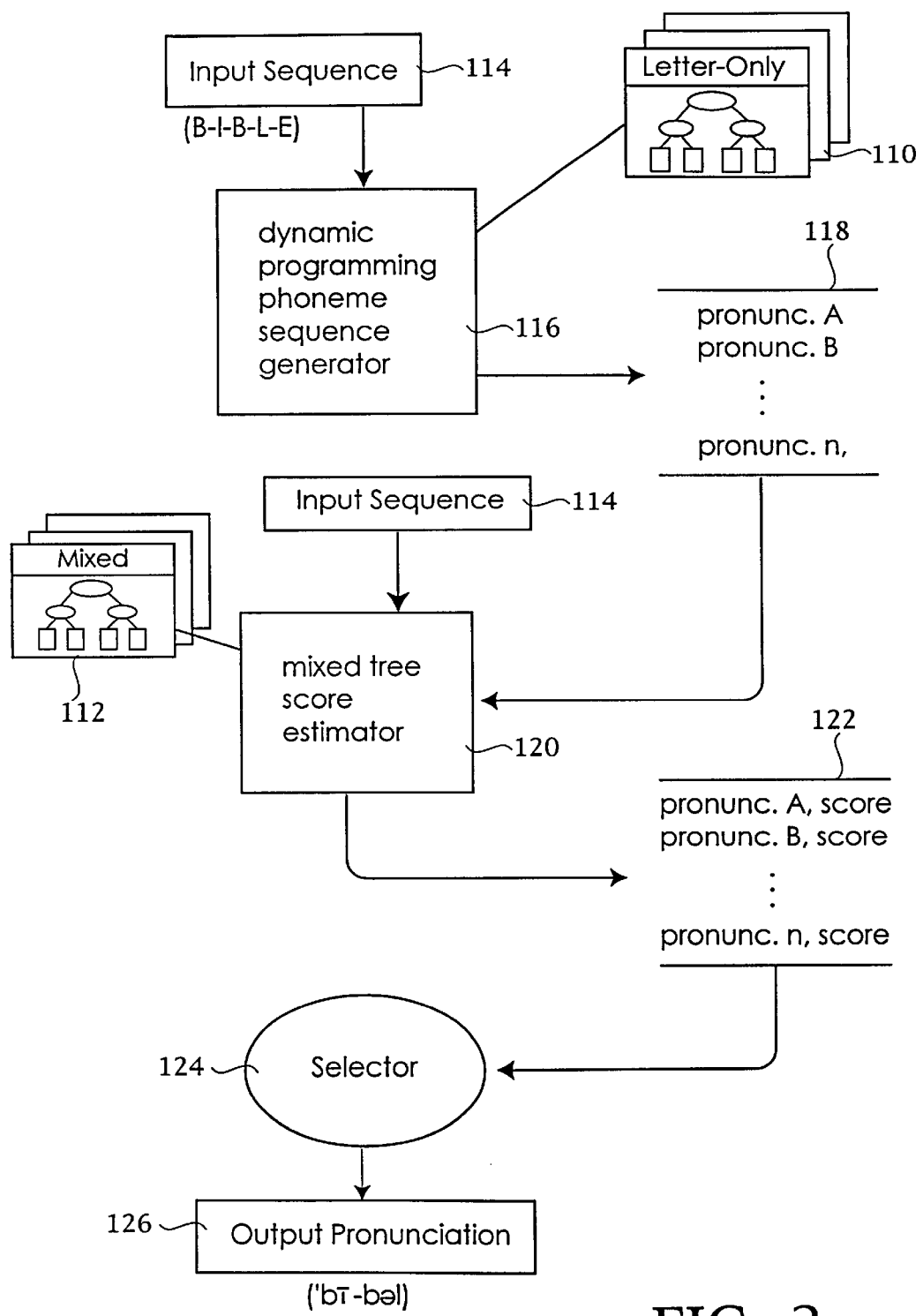
FIG. 3 is a block diagram illustrating the presently preferred phoneticizer using decision trees.
Figure 4:
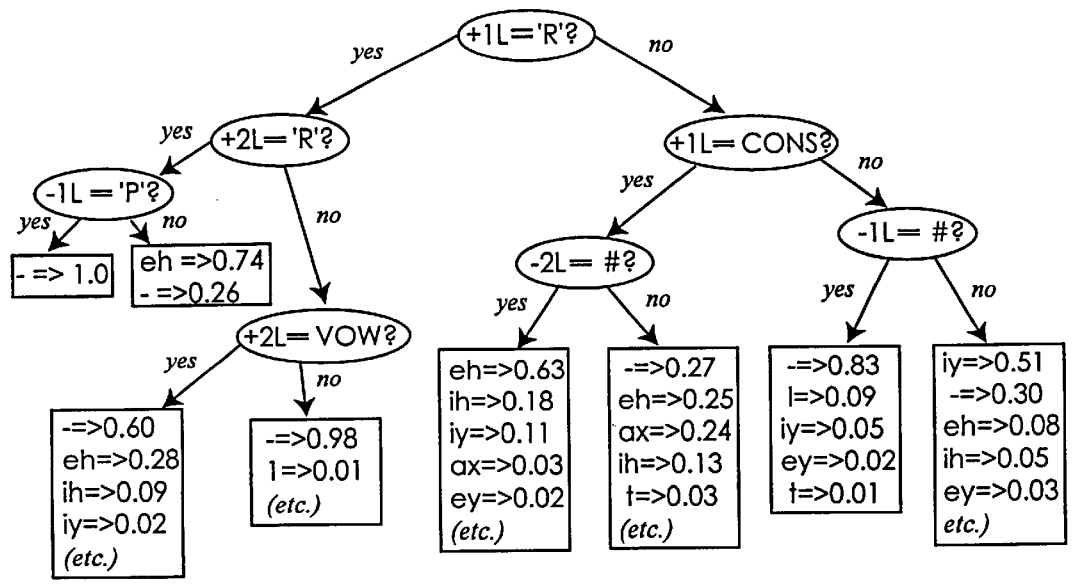
FIG. 4 is a tree diagram illustrating a letter-only tree.

Preferably the set of letter-only decision trees includes a decision tree for each letter in the alphabet. FIG. 4 shows an example of a letter-only decision tree for the letter E. The decision tree comprises a plurality of internal nodes (illustrated as ovals in the Figure) and a plurality of leaf nodes (illustrated as rectangles in the Figure). Each internal node is populated with a yes-no question. Yes-no questions are questions that can be answered either yes or no. In the letter-only tree these questions are directed to the given letter (in this case the letter E) and its neighboring letters in the input sequence. Note in FIG. 3 that each internal node branches either left or right depending on whether the answer to the associated question is yes or no.

Abbreviations are used in FIG. 4 as follows: numbers in questions, such as "+1" or "−1" refer to positions in the spelling relative to the current letter. For example, "+1L== 'R'?" means "Is the letter after the current letter (which in this case is the letter E) an R?" The abbreviations CONS and VOW represent classes of letters, namely consonants and vowels. The absence of a neighboring letter, or null letter, is represented by the symbol -, which is used as a filler or placeholder where aligning certain letters with corresponding phoneme pronunciations. The symbol # denotes a word boundary.

The leaf nodes are populated with probability data that associate possible phoneme pronunciations with numeric values representing the probability that the particular phoneme represents the correct pronunciation of the given letter. For example, the notation "iy=>0.51" means "the probability of phoneme 'iy' in this leaf is 0.51." The null phoneme, i.e., silence, is represented by the symbol '-'.

The sequence generator 116 (FIG. 3) thus uses the letter-only decision trees 110 to construct one or more pronunciation hypotheses that are stored in list 118. Preferably each pronunciation has associated with it a numerical score arrived at by combining the probability scores of the individual phonemes selected using the decision tree 110. Word pronunciations may be scored by constructing a matrix of possible combinations and then using dynamic programming to select the n-best candidates. Alternatively, the n-best candidates may be selected using a substitution technique that first identifies the most probable transcription candidate and then generates additional candidates through iterative substitution, as follows.

The pronunciation with the highest probability score is selected first, by multiplying the respective scores of the highest-scoring phonemes (identified by examining the leaf nodes) and then using this selection as the most probable candidate or first-best word candidate. Additional (n-best) candidates are then selected by examining the phoneme data in the leaf nodes again to identify the phoneme, not previously selected, that has the smallest difference from an initially selected phoneme. This minimally-different phoneme is then substituted for the initially selected one to thereby generate the second-best word candidate. The above process may be repeated iteratively until the desired number of n-best candidates have been selected. List 118 may be sorted in descending score order, so that the pronunciation judged the best by the letter-only analysis appears first in the list.

As noted above, a letter-only analysis will frequently produce poor results. This is because the letter-only analysis has no way of determining at each letter what phoneme will be generated by subsequent letters. Thus a letter-only analysis can generate a high scoring pronunciation that actually would not occur in natural speech. For example, the proper name, Achilles, would likely result in a pronunciation that phoneticizes both ll's: ah-k-ih-I-I-iy-z. In natural speech, the second I is actually silent: ah-k-ih-I-iy-z. The sequence generator using letter-only trees has no mechanism to screen out word pronunciations that would never occur in natural speech.

The second stage of the pronunciation system addresses the above problem. A mixed-tree score estimator 120 uses the set of mixed-decision trees 112 to assess the viability of each pronunciation in list 118. The score estimator works by sequentially examining each letter in the input sequence along with the phonemes assigned to each letter by sequence generator 116.

Figure 5:
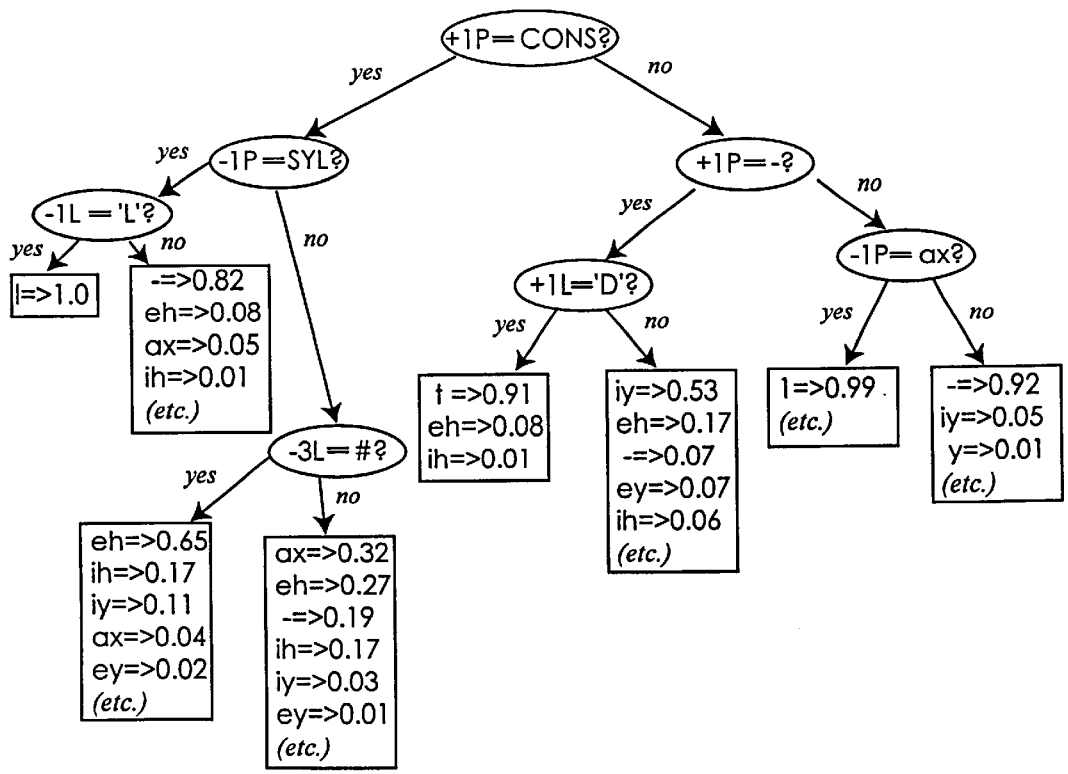
FIG. 5 is a tree diagram illustrating a mixed tree in accordance with the invention.

Like the set of letter-only trees, the set of mixed trees has a mixed tree for each letter of the alphabet. An exemplary mixed tree is shown in FIG. 5. Like the letter-only tree, the mixed tree has internal nodes and leaf nodes. The internal nodes are illustrated as ovals and the leaf nodes as rectangles in FIG. 5. The internal nodes are each populated with a yes-no question and the leaf nodes are each populated with probability data. Although the tree structure of the mixed tree resembles that of the letter-only tree, there is one important difference. The internal nodes of the mixed tree can contain two different classes of questions. An internal node can contain a question about a given letter and its neighboring letters in the sequence, or it can contain a question about the phoneme associated with that letter and neighboring phonemes corresponding to that sequence. The decision tree is thus mixed, in that it contains mixed classes of questions.

The abbreviations used in FIG. 5 are similar to those used in FIG. 4, with some additional abbreviations. The symbol L represents a question about a letter and its neighboring letters. The symbol P represents a question about a phoneme and its neighboring phonemes. For example the question "+1L=='D'?" means "Is the letter in the +1 position a 'D'?" The abbreviations CONS and SYL are phoneme classes, namely consonant and syllabic. For example, the question "+1P==CONS?" means "Is the phoneme in the +1 position a consonant?" The numbers in the leaf nodes give phoneme probabilities as they did in the letter-only trees.

The mixed-tree score estimator rescores each of the pronunciations in list 118 based on the mixed-tree questions and using the probability data in the lead nodes of the mixed trees. If desired, the list of pronunciations may be stored in association with the respective score as in list 122. If desired, list 122 can be sorted in descending order so that the first listed pronunciation is the one with the highest score.

In many instances the pronunciation occupying the highest score position in list 122 will be different from the pronunciation occupying the highest score position in list 118. This occurs because the mixed-tree score estimator, using the mixed trees 112, screens out those pronunciations that do not contain self-consistent phoneme sequences or otherwise represent pronunciations that would not occur in natural speech.

If desired a selector module 124 can access list 122 to retrieve one or more of the pronunciations in the list. Typically selector 124 retrieves the pronunciation with the highest score and provides this as the output pronunciation 126.

What is claimed is:

1. A method for automatically generating the phonetic transcription associated with a spelled word, comprising:

transcribing said spelled word into sound units to generate a plurality of transcriptions each corresponding to said spelled word without using a pre-existing dictionary;

associating a score with each transcription;

supplying said plurality of transcriptions to an automatic speech recognizer;

supplying speech data corresponding to said spelled word to said automatic speech recognizer when none of the scores is above a predetermined threshold; and using said automatic speech recognizer to rescore said transcriptions based on said speech data.

2. The method of claim 1 wherein said transcribing step generates a plurality of phonetic transcriptions.

3. The method of claim 1 wherein said transcribing step generates a plurality of morphemic transcriptions.

4. The method of claim 1 wherein said sound units correspond to acoustic models.

5. The method of claim 1 wherein said sound units correspond to speech templates.

6. The method of claim 1 further comprising using said recognizer to select at least one transcription for updating a lexicon.

7. The method of claim 1 wherein said transcribing step is performed using a trainable transcription generator and wherein said method further comprises using said recognizer to select at least one transcription and using said at least one transcription to retrain said transcription generator.

8. The method of claim 1 wherein said transcribing step is performed using a trainable transcription generator employing at least one decision tree and wherein said method further comprises using said recognizer to select at least one transcription and using said at least one transcription to update said at least one decision tree.

9. The method of claim 1 further comprising selecting at least one of said transcriptions and using said at least one transcription to update a lexicon.

10. A system for updating a lexicon based on spelled word input comprising:

transcription generator receptive of said spelled word input for generating a plurality of scored transcriptions without using a pre-existing dictionary; and a confidence checking mechanism for determining whether any of the scored transcriptions has a confidence level above a predetermined threshold;

an automatic speech recognizer receptive of speech data corresponding to said spelled word input for rescoring said plurality of scored transcriptions to generate a plurality of rescored transcriptions when none of the scored transcriptions has a confidence level above the predetermined threshold; and selection mechanism for selecting and using at least one of said rescored transcriptions to update said lexicon.

11. The system of claim 10 wherein said transcription generator produces a set of phonetic transcriptions.

12. The system of claim 10 wherein said transcription generator produces a set of morpheme transcriptions.

13. The system of claim 10 wherein said transcription generator is a phoneticizer employing decision trees.

14. The system of claim 10 wherein said selection mechanism provides at least one of said rescored transcriptions for retraining said transcription generator.

15. The system of claim 10 wherein said transcription generator is a phoneticizer employing decision trees and wherein said selection mechanism provides at least one of said rescored transcriptions for updating said decision trees.

* * * * *